United States Patent

[11] 3,575,476

| [72] | Inventor | Frederick W. Ortman |
| | | Milan, Ohio |
| [21] | Appl. No. | 767,309 |
| [22] | Filed | Oct. 14, 1968 |
| [45] | Patented | Apr. 20, 1971 |
| [73] | Assignee | General Motors Corporation |
| | | Detroit, Mich. |

[54] GAS BEARING
5 Claims, 3 Drawing Figs.

[52] U.S. Cl. ................................................ 308/9
[51] Int. Cl. ................................................ F16c 17/16
[50] Field of Search .................................. 308/(A), 9, 122, 121, 78, 161, 162

[56] References Cited

UNITED STATES PATENTS

| 25,921 | 10/1959 | Stone | 308/164 |
| 3,026,150 | 3/1962 | Buckley et al. | 308/A |
| 3,132,903 | 5/1964 | Webb | 308/122 |
| 3,186,774 | 6/1965 | Wilcox | 308/9 |
| 3,256,451 | 6/1966 | Shipman | 308/9 |
| 3,368,850 | 2/1968 | Wilcox | 308/9 |

FOREIGN PATENTS

| 267,947 | 3/1928 | Great Britain | 308/240 |

Primary Examiner—Fred C. Mattern, Jr.
Assistant Examiner—Frank Susko
Attorneys—Warren E. Finken and F. J. Fodale ABSTRACT: An externally pressurized gas bearing in which the stationary bearing surface is made up of a plurality of stacked washers. A set of alternate relatively soft washers have one face grooved to provide manifolding and radial supply passages from the supply plenum to the hydrostatic gas bearing layer. The washers in the other alternate set are plain, of a relatively harder material and have smaller internal diameters to provide a plain bearing surface should the external pressure gas source suddenly fail. The design facilitates a family of fixed diameter bearings in which the length is tailored to meet the needs of various load carrying capacities.

PATENTED APR 20 1971 3,575,476

INVENTOR.
Frederick W. Ortman
BY
H. J. Fodale
ATTORNEY

GAS BEARING

My invention relates generally to bearings and more specifically to radial fluid film bearings in which the load of the rotating member is sustained by the pressure in a fluid layer between the rotating member and a stationary member. The load capacity of such a bearing is the product of the fluid pressure integrated over the bearing area on which it acts. In a radial bearing, the product is affected both by the diameter and the length of the bearing.

In one of its broadest aspects, the object of my invention is to provide a bearing of a design which facilitates the production of a family of bearings of varying load capacity. Since other load capacity design factors such as speed and/or supply pressure (in the case of an externally pressurized bearing) is not normally controlled by the bearing supplier and since diameter changes do not change load linearly, my invention is directed to providing a family of bearings in which the bearings differ only in length and include a number of common parts.

In another of its broadest aspects, my invention concerns itself with externally pressurized fluid film bearings in general and particularly those of the orifice as opposed to porous sleeve type in which a compressible fluid is utilized as the load carrying medium.

In such a bearing, the accuracy of the orifice size, maintenance of the cleanliness to prevent clogging and its general protection in case of the sudden loss of the pressurized load carrying medium source are important design considerations. Accordingly, in another of its broadest aspects, the object of my invention is to provide an externally pressurized fluid film bearing of the orifice type in which accurate orifices are provided in a simple and efficient manner and to the method of making such a bearing. It is another object to provide such a bearing in which the cleanliness of the orifices is easily maintained.

It is yet another object of my invention to provide such a bearing in which the orifices are protected at all times and under all circumstances.

While the incorporation of either aspect of my invention into a bearing design will result in improvement and realized advantages, greatest improvement and realized advantages result from incorporation of both aspects of my invention into a family of bearings of the externally pressurized, orifice type, especially one in which a compressible fluid is utilized as the load carrying medium.

Other objects and features of the invention will become apparent to those skilled in the art as the disclosure is made in the following detailed description of a preferred embodiment of the invention as illustrated in the accompanying sheet of drawing in which.

Figure 1:
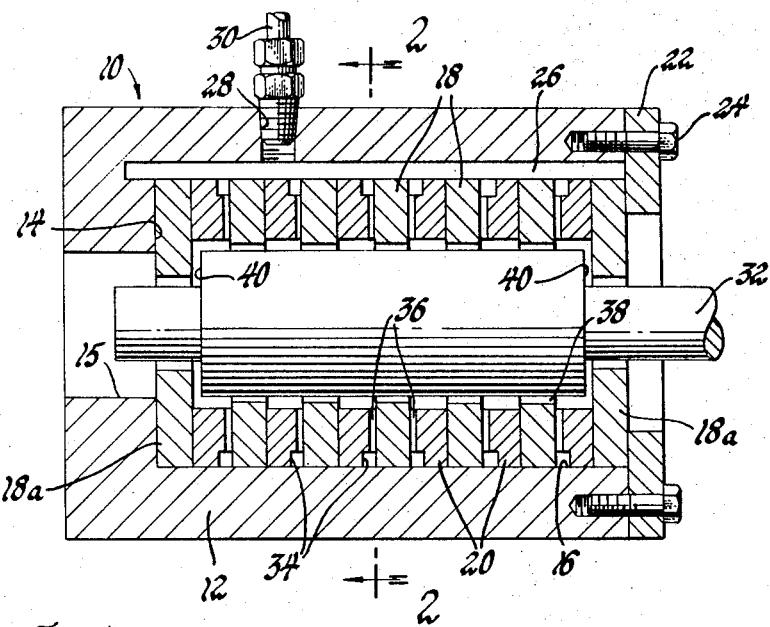
FIG. 1 is an elevation view partially in cross section showing an externally pressurized gas bearing in accordance with my invention.
Figure 2:
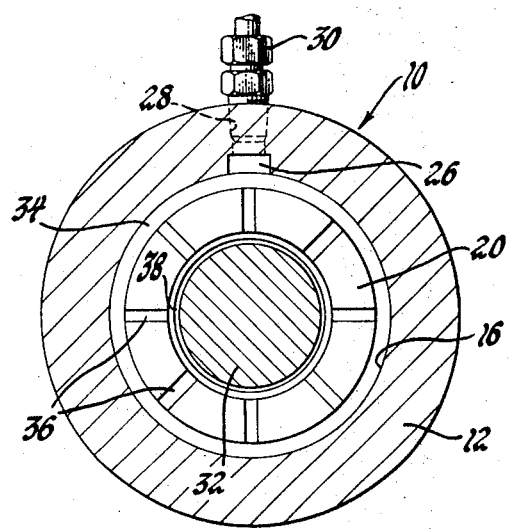
FIG. 2 is a sectional view taken along the line 2-2 of FIG. 1 and looking in the direction of the arrows.

Referring now to the drawings and more specifically to FIG. 1, the externally pressurized gas bearing indicated generally at 10 is of the type having a fixed outer member and an inner rotor, however, my invention is equally applicable to one in which the inner member is stationary and an outer rotatable shell is supported by a gas film.

The outer stationary member 12 has a bore 16 and a counterbore 15 to provide shoulder 14 adjacent its left-hand end. A stack of discs or washers 18 and 20 fit within the bore 16 between the shoulder 14 and an end plate 22 suitably secured to the right end face of the stationary member 12 in any suitable manner, for instance by bolts 24. An axial groove 26 in the stationary member 12 opens into the bore 16 and together with a portion on the outer circumferential surface of the washers 18 and 20 form a plenum. A radial passage 28 threadably receives a conduit 30 connected to a source of pressurized gas, not shown, to supply pressurized gas to the plenum. A rotor 32 is nested with the stacked washers 18 and 20 and are so dimensioned with respect to their inner circumferential surfaces so that in operation, there is a space 38 therebetween on the order of a few thousandths of an inch. The clearance space 38 depends on a number of factors and can be calculated in a well-known manner from given fixed parameters such as load capacity, source pressure, etc.

Figure 3:
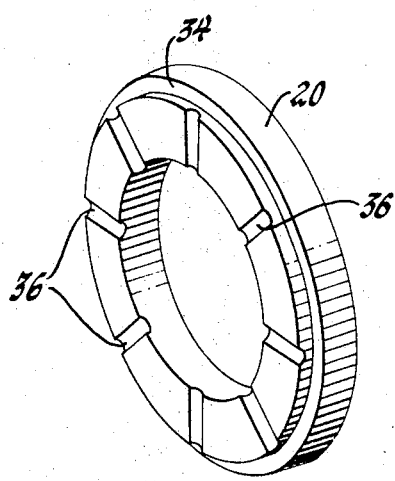
FIG. 3 is a perspective view of one of the washer elements shown in FIGS. 1 and 2.

It is to be noted that the stack of washers comprises the plain washers 18 with planar faces alternated with the washers 20, a typical one of which is shown in perspective in FIG. 3. In one of the faces of the washer 20 is an annular groove 34 at its outer or nonbearing margin and a number of circumferentially spaced radial slots 36 which extend from the groove 34 to the inner circumferential or bearing surface of the washer 20. Returning to FIG. 1, the washer 20 is located adjacent a plain washer 18 so that the groove 34 forms a manifold which distributes pressurized gas from the plenum to the conduits formed by the slots 36 in the washer 20 and the plain washer 18, which in turn communicate with the space 38. The inner diameter of the washers 20 is preferably greater than the inner diameter of the washers 18 and the washers 18 are preferably fabricated of a high wear resistant material so that should the gas supply be interrupted, the rotor 32 rides on the inner circumferential surfaces of the washers 18 and does not disturb the washers 20 or the openings formed by the radial passages 36. Because of the presence of washers 18 and the protection they provide, the washers 20 can be relatively soft initially and do not require subsequent hardening. This fact gives an advantage in fabricating the bearing because only the soft washers are modified with grooves and slots. Secondly since the grooves and slots are open, they can easily be provided by coining, etching, vapor blasting or EDM techniques. Once more precise dimensions can easily be provided for the slots by plating and other similar techniques.

The end washers 18a are shown as having a smaller internal diameter and cooperate with the surfaces 40 on the rotor 32 to center the rotor 32 within the stationary member 12 for those instances where centering is required.

The gas bearing operates in the normal manner, that is, gas from the pressurized source, not shown, is fed to the axial passage 26 or plenum to the annular grooves 34 which act as manifolds to distribute the pressurized gas to the plurality of circumferentially spaced radial passages 36 in each of the washers 20. The gas from these many radial passages 36 enters the space 38 under pressure thereby rotatably supporting the rotor 32. As the gas flows axially outwardly toward the end of the bearing, it also provides a thrust bearing between the surfaces 40 on the rotor 32 and the end washers 18a. In addition to providing the attendant advantages above described, this design allows for the fabrication of a whole family of bearings of various load capacities having many common parts, that is, the combination of a standard designed washer 18 with a plain washer 18 with each member of the family varying in length and number of washers 18 and 20.

I wish it to be understood that I do not desire to be limited to the exact details of construction shown and described for obvious modifications will occur to a person skilled in the art.

I claim:

1. An externally pressurized fluid film bearing comprising combination, a stationary member having a plenum adapted to be fluidly connected to a source of pressurized gas, a plurality of stacked washers carried by said stationary member, said washers having exposed circumferential surfaces, a rotatable member having a circumferential bearing surface spaced sufficiently close to said exposed circumferential surfaces to maintain a load-carrying hydrostatic gas layer therebetween, said plurality of stacked washers including at least one pair of washers consisting of a plain washer adjacent a washer having radial passage means in its annular face adjacent said plain washer, said gas passage means opening into said exposed circumferential surface and into said plenum whereby said rotatable member is adapted to be rotatably supported by a hydrostatic fluid film layer when said plenum is fluidly connected to a source of pressurized fluid, said plain washer having its exposed circumferential surface slightly closer to said circumferential bearing surface than said washer having radial passage means to protect said radial passage means.

2. The externally pressurized fluid film bearing as defined in claim 1 wherein said washer having radial passage means in its annular face has a circumferential groove in its said annular face at the margin thereof remote from its exposed circumferential surface, and a plurality of radial grooves in its said annular face extending from its said circumferential groove and opening into its said exposed circumferential surface, said radial grooves opening into said plenum through said circumferential groove.

3. An externally pressurized gas bearing comprising in combination, an elongated stationary member having an axial radially open groove, a plurality of stacked washers mounted on said stationary member with each of the washers first circumferential surface overlying said open groove forming a plenum and each of the washers opposite circumferential surface exposed, means to fluidly connected said plenum to a source of pressurized gas, a rotatable member having a bearing surface spaced sufficiently close to said exposed circumferential surfaces to maintain a load-carrying hydrostatic gas layer therebetween, alternate washers of said plurality of stacked washers each having a circumferential groove in one face thereof at said first circumferential surface, and a plurality of radial grooves in said one face extending from said circumferential groove to said opposite circumferential surface whereby said any pressurized gas supplied to said plenum is manifolded to said radial grooves and flows into the space between said exposed circumferential surfaces and said bearing surface.

4. The gas bearing as defined in claim 3 wherein said rotatable member includes thrust surfaces and wherein said plurality of washers include two washers having faces spaced closely adjacent to said thrust surfaces, respectively, whereby pressurized gas flows between said faces and thrust surfaces to center said rotatable member on said stationary member.

5. The combination as defined in claim 3 wherein the remaining washers are plain washers and have their exposed circumferential surfaces slightly closer to said bearing surface to protect said radial grooves in said alternate washers.